UNITED STATES PATENT OFFICE.

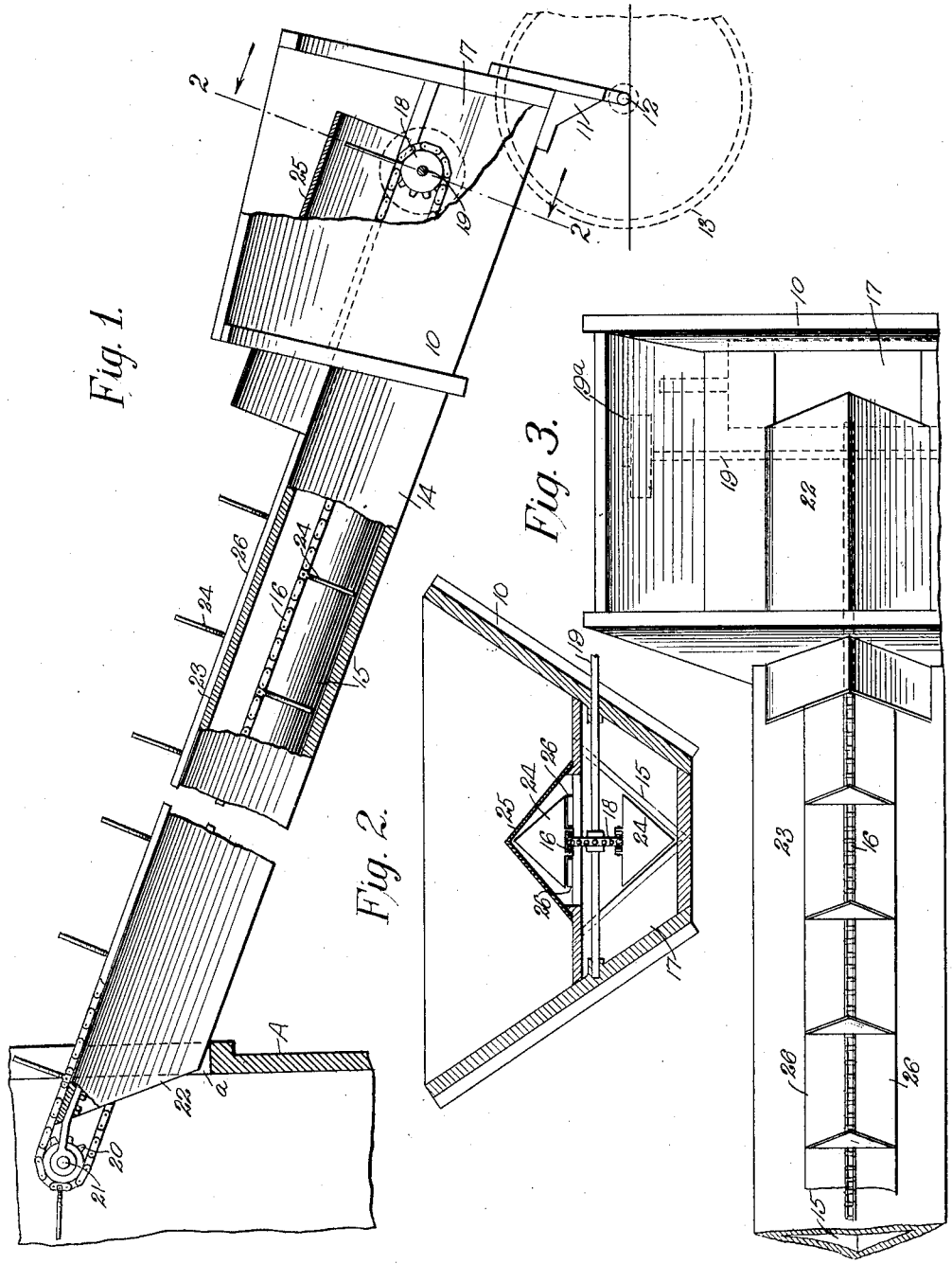

JOHN B. MAJERUS, OF BELLECHESTER, MINNESOTA.

GRAIN-ELEVATOR.

1,338,514.  Specification of Letters Patent.  Patented Apr. 27, 1920.

Application filed September 4, 1918. Serial No. 252,611.

*To all whom it may concern:*

Be it known that I, JOHN B. MAJERUS, a citizen of the United States, and a resident of Bellechester, Goodhue Post-Office, in the county of Goodhue and State of Minnesota, have invented a new and Improved Grain-Elevator, of which the following is a description.

My invention relates to portable grain elevators adapted to be transported from place to place and variously positioned according to the point to which the grain is to be elevated.

An object of my invention is to provide a portable elevator possessing certain characteristics and advantages among which are the following: A body is provided in hopper form to constitute the boot of the elevator and an elevating trunk is rigid at one end with said body and extends forwardy a proper length to deliver grain at any desired height within the capacity of the elevator; the body is provided with an axle at the under side, at the rear end, for receiving running wheels for transporting the elevator, the hopper body with its axle constituting the base of the elevator, the latter being thereby adapted to be rocked vertically about the axis of the axle when the latter is on the ground to vary the angular position of the hopper body and trunk; the outer free end of the trunk is adapted to rest on the structure into which the grain is to be delivered; the trunk includes a V-shaped trough through which the working run of the elevator chain or belt travels so that the flights or buckets thereon which are of V-shape to accord with the trough, constitute drag buckets, the return run of the elevator chain traveling over the top of the trunk; the various features of the elevator are thereby embodied in a structure exceedingly simple as a whole and comparatively light, which with the manner of varying the angular disposition of the elevator by a bodily rocking thereof with the axle as a pivot point, promotes convenience in the positioning and operation of the elevator.

Reference is to be had to the accompanying drawings forming a part of this specification, it being understood that the drawings are merely illustrative of one example of the invention.

Figure 1 is a side elevation of a portable grain elevator embodying my invention, parts being broken away and others in section;

Fig. 2 is a cross section on the line 2—2, Fig. 1;

Fig. 3 is a plan view of a portion of said elevator.

In carrying out my invention in accordance with the illustrated example, a body 10 is provided of hopper form into which grain may be shoveled or dumped from bags or otherwise deposited. On the hopper at the under side, at the rear end, that is to say, at the rear lower angle of the body, an axle 12 is provided, adapted to receive running wheels as indicated in dotted lines at 13, Fig. 1, the wheels being usually in place only in transporting the elevator and then removed so that the body 10 and axle constitute the base of the elevator so that the angular position of the same may be varied by vertically rocking about the axis of the axle 12 as a center. The axle in the form shown is formed or secured to a bolster 11 on the body.

An elevator trunk 14 is rigid at one end with the front end of the body 10 and extends in practice about twenty feet usually, or any other practical length. The trunk presents a V-shaped interior or working chamber 15 clearly shown in Fig. 2 and the elevating means is usually in the form of an endless chain belt 16 running over the sprocket wheel 18 on a transverse drive shaft 19 having a pulley 19ª to receive power from any convenient source, usually from a gas engine (not shown). The shaft 19 is located at the boot 17 of the elevator which is formed by the bottom of the hopper body 10. At the other end the chain belt runs over a sprocket wheel 20 on a transverse shaft 21 suitably supported on the trunk 14. The under run of the chain 16 traveling in the chamber 15 constitutes the working run to carry the grain from the boot 17 upwardly and discharge the same to the open upper end of the trunk 14, said upper end being advantageously beveled as at 22 at the under side for the ready discharge of the grain through an opening a, for example, in a barn or bin A. The upper run of the chain returns over a table 23 constituting the top of the working chamber 15.

The flights 24 of the elevator belt are in the form of V-shaped blades to accord with the shape of the chamber 15, this arrangement making for efficiency in maximizing the capacity of the elevator. A hood or shield 25 is arranged in the hopper body 10 over the elevator belt and extends forwardly somewhat beyond said body to guard the returning flights 24 that they may not strike a workman should he find occasion for standing on the trunk 14 at the front of the body in shoveling into the boot 17 the last of the grain received by the hopper body 10.

Thus, the shield 25, within the hopper body, forms in effect part of the hopper structure in determining the form and dimensions of the throat thereof presented between the rear end of the shield and the rear wall of the hopper body.

The table 23 is advantageously provided with spaced longitudinal strips or cleats 26 on which the flights 24 travel and between which the chain 16 is accommodated, said cleats serving to take the wear of the flights; they contribute to the stiffening of the trunk 14 also.

In practice the elevator having been hauled to the position in which it is to be operated, the running wheels are removed from the axle 12 so that the latter rests on the ground to firmly support the elevator but permitting of the bodily rocking of the same vertically to dispose the elevator at the proper height and angle.

In transporting the elevator the front end of the trunk 14 is suitably connected with and supported on any motor vehicle or horse vehicle.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A portable grain elevator including a body of hopper form adapted to receive the grain to be elevated, an elevator trunk extending forwardly from the body, an endless conveyer associated with said body and trunk to carry grain forwardly in the trunk to the forward end thereof, said conveyer having the return run thereof at the top surface of said trunk at the approximate center thereof so that the top of the trunk forms a table at each side of the conveyer, and a shield disposed over the conveyer in said hopper body to constitute part of the hopper structure, said shield being spaced from the rear wall of the hopper a distance to form therewith a throat leading behind the rear end of the conveyer, the shield furthermore extending beyond the front end of the hopper body and partially over said conveyer and table.

2. A portable grain elevator including a body of hopper form adapted to receive the grain to be elevated, an elevator trunk extending forwardly from the body, a conveyer associated with said body and trunk to carry grain forwardly in the trunk to the discharge thereof, the rear end of the conveyer being disposed in the hopper near the rear wall thereof, and a shield disposed in said body over said conveyer and constituting part of the hopper structure, the shield being spaced from the rear wall of the hopper a distance to form therewith a throat leading behind the rear end of the conveyer and serving to aid in directing the grain to said throat.

JOHN B. MAJERUS.